U.S. Patent Office 3,507,910
Patented Apr. 21, 1970

3,507,910
[(1-ORGANOTHIO-2-NITROALKYL)PHE-
NOXY]ALKANOIC ACIDS
Everett M. Schultz, Ambler, Pa., assignor to Merck & Co.,
Inc., Rahway, N.J., a corporation of New Jersey
No Drawing. Filed Mar. 23, 1967, Ser. No. 625,333
Int. Cl. C07c *103/26, 149/40*
U.S. Cl. 260—516                                11 Claims

ABSTRACT OF THE DISCLOSURE

This invention relates to [(1-organothio-2-nitroalkyl)phenoxy]alkanoic acid products which are synthesized by the addition of mercaptan across the vinyl double bond of a [(2-nitro-1-alkenyl)phenoxy]alkanoic acid ester followed by the acid hydrolysis of the [(1-organothio-2-nitroalkyl)phenoxy]alkanoate intermediate thus formed to the corresponding acid. The products thus obtained and the corresponding ester and amide derivatives are diuretics and saluretics which are useful in the treatment of conditions associated with edema.

---

This invention relates to a new class of chemical compounds which can be described generally as [(1-organothio-2-nitroalkyl)phenoxy]alkanoic acids and to the nontoxic, pharmacologically acceptable esters and amide derivatives thereof.

Pharmacological studies show that the instant products are effective diuretic and saluretic agents which can be used in the treatment of conditions associated with electrolyte and fluid retention and hypertension. When administered in therapeutic dosages in conventional vehicles the instant products effectively reduce the amount of sodium and chloride ions in the body, lower dangerous excesses of fluid levels to acceptable limits and, in general, alleviate conditions associated with edema.

The products of this invention are compounds having the following general formula:

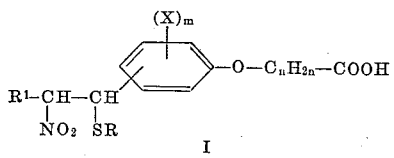

I wherein R is alkyl, for example, lower alkyl such as methyl, ethyl, propyl, isopropyl, isobutyl, etc.; cycloalkyl, for example, lower cycloalkyl containing from 5–6 nuclear carbon atoms such as cyclopentyl, cyclohexyl, etc.; lower alkenyl, for example allyl, etc.; halo lower alkyl, for example, 3-chloropropyl, etc.; carboxy lower alkyl, for example, 2-carboxyethyl, 3-carboxypropyl, etc.; lower alkanoyl, for example, acetyl, etc.; aryl, for example, mononuclear aryl such as phenyl which may be unsubstituted or substituted by carboxy such as 2-carboxyphenyl; or aralkyl, for example, mononuclear aralkyl such as benzyl, phenethyl, etc.; $R^1$ is hydrogen or alkyl, for example, lower alkyl such as methyl, ethyl, butyl, pentyl, heptyl, etc.; the X radicals are similar or dissimilar members selected from hydrogen, halogen, for example, chloro, bromo, fluoro, iodo, etc.; alkyl, for example, lower alkyl such as methyl, ethyl, etc., and, taken together, two X radicals on adjacent carbon atoms of the benzene ring may be joined to form an hydrocarbylene chain, i.e., a divalent organic radical composed solely of carbon and hydrogen, containing from 3–4 carbon atoms between their points of attachment, for example, trimethylene, tetramethylene, 1,3-butadienylene, i.e., —CH=CH—CH=CH—, etc.; $m$ is an integer having a value of 1–4, and $n$ is an integer having a value of 1–3; and the nontoxic, pharmacologically acceptable alkyl esters, amide, lower alkylamide and di-lower alkylamide derivatives thereof.

A preferred embodiment of this invention relates to [4-(1-organothio-2-nitroalkyl)phenoxy]acetic acids having the following general formula:

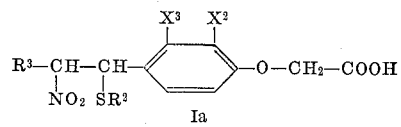

Ia wherein $R^2$ is lower alkyl, lower alkenyl, lower alkanoyl, phenyl or 2-carboxyphenyl; $R^3$ is lower alkyl and $X^2$ and $X^3$ are similar or dissimilar members selected from hydrogen, halogen and lower alkyl; and the nontoxic, pharmacologically acceptable lower alkyl ester and amide derivatives thereof. The foregoing class of compounds exhibits particularly good diuretic and saluretic activity and represents a preferred subgroup of compounds within the scope of this invention.

The instant products (I) are conveniently obtained by the reaction of an ester of a [(2-nitro-1-alkenyl)phenoxy]alkanoic acid (II, infra) with an appropriate mercaptan to yield a [(1-organothio-2-nitroalkyl)phenoxy]alkanoate (IIa, infra) which, if desired, may be isolated per se as the product or, alternatively, may be converted by acid hydrolysis to the corresponding [(1-organothio-2-nitroalkyl)phenoxy]alkanoic acid (I). Also, it has been found that the reaction is catalyzed by the presence of base as, for example, by piperidine, morpholine or by lower alkylamines such as ethylamine, etc. The following equation illustrates this process:

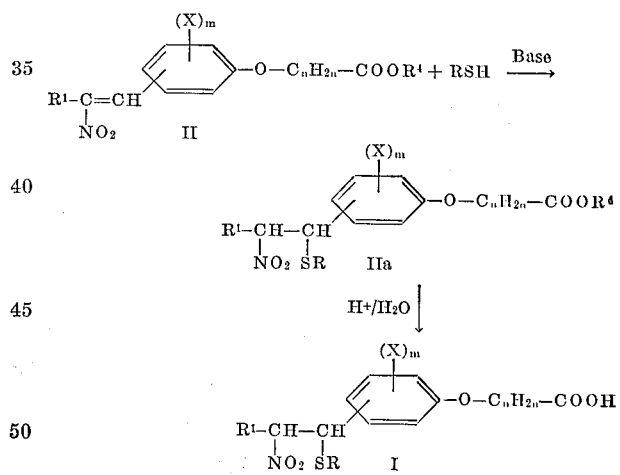

wherein $R^4$ is an alkyl radical, for example, lower alkyl such as methyl, ethyl, propyl, butyl, etc.; $H^+$ is the cation derived from an organic or inorganic acid such as hydrochloric acid, etc., and R, $R^1$, X, $m$ and $n$ are as defined above. The choice of a suitable solvent for the process is dependent largely upon the character of the reactants but, in general, any medium which is substantially inert and in which the reactants are reasonably soluble may be employed; thus, it has been found that the lower alkanols such as methanol, ethanol, etc., are particularly advantageous media in which to conduct the reaction. Also, the process may be conducted at ambient temperatures but, in general, it is desirable to conduct the reaction with the application of slight heating as, for example, by heating at temperatures slightly above room temperature, e.g., 30–50° C.

The amide derivatives of the instant products (I) may be synthesized from the corresponding [(1-organothio-2-nitroalkyl)phenoxy]alkanoic acids (I) by conventional means as, for example, by the reaction of a [(1- organothio-2-nitro-alkyl)phenoxy]alkanoic acid halide with ammonia or with an appropriate monoalkylamine or dialkylamine to yield the corresponding amides, monoalkylamides or dialkylamides. The said [(1-organothio-2-nitroalkyl)phenoxy]alkanoic acid halide reactants are obtained from their corresponding [(1-organothio-2-nitroalkyl)phenoxy]alkanoic acid precursors in the conventional manner by treatment with a suitable halogenating agent as, for example, by treatment with thionyl chloride. Also, according to another method for the preparation of the amide derivatives, an ester of a [(1-organothio-2-nitroalkyl)phenoxy]alkanoic acid may be treated with ammonia or with an appropriate monoalkylamine or dialkylamine to yield the corresponding [(1-organothio-2-nitroalkyl)-phenoxy]alkanoic acid amide, monoalkylamide, or dialkylamide.

The foregoing and other equivalent methods for the preparation of the esters and amides of the [(1-organothio-2-nitroalkyl)phenoxy]alkanoic acid products (I) will be apparent to those having ordinary skill in the art and to the extent that the said derivatives are both non-toxic and physiologically acceptable to the body system the said esters and amides are the functional equivalent of the [(1-organothio - 2 - nitroalkyl)phenoxy]alkanoic acids (I).

The [(2-nitro-1-alkenyl)phenoxy]alkanoic acid ester starting materials (II) of the instant process are prepared by the reaction of an ester of a formyl substituted phenoxy-alkanoic acid (III, infra) with a primary amine followed by the reaction of the Schiff-base intermediate thus formed with a nitroalkane. Preferably, the condensation of the formyl substituted alkanoic acid ester (III) with the primary amine is conducted in the presence of a water-immiscible solvent to allow for removal of the water formed during the synthesis as, for example, by azeotropic distillation or, alternatively, by the use of chemical dehydrating agents or molecular sieves. In general, any water-immiscible medium in which the reactants are reasonably soluble may be employed but benzene has proved to be a particularly advantageous solvent for this purpose. The following equation illustrates the process:

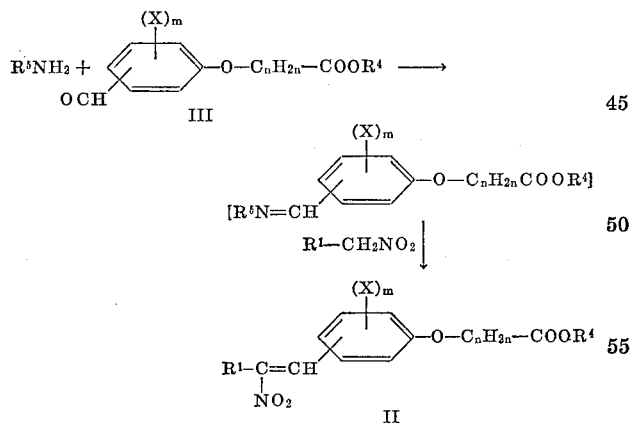

wherein $R^5$ is alkyl, for example, lower alkyl such as methyl, ethyl, propyl, butyl, etc. or mononuclear aryl such as phenyl, p-tolyl, naphthyl, etc. and $R^1$, $R^4$, X, $m$ and $n$ are as defined above.

The formyl substituted phenoxyalkanoic acid esters (III) employed as starting materials in the aforementioned reaction with the primary amine and nitroalkane reactants may be prepared by either of two alternate routes: (a) by the etherification of a nuclear hydroxy substituted benzaldehyde (IV) or (b) by the formylation of a phenoxyalkanoic acid ester (V).

The etherification process for the preparation of the formyl substituted phenoxyalkanoic acid esters (IIIa, infra) consists in treating a nuclear hydroxy substituted benzaldehyde (IV, infra) with an haloalkanoic acid ester in which the alkylene chain joining the halogen and carboxy groups is methylene or trimethylene in the presence of a base and, preferably, at temperatures above ambient temperature. Suitable bases which may be employed in the process include, for example, sodium or potassium carbonate, sodium or potassium hydroxide or a sodium alcoholate such as sodium ethoxide. The choice of a suitable reaction solvent is dependent largely upon the character of the reactants employed but, in general, any solvent which is substantially inert to the reactants and in which the reagents are reasonably soluble may be used. Ethanol, acetone and dimethylformamide have proved to be particularly advantageous solvents in which to conduct the synthesis. The following equation illustrates the reaction:

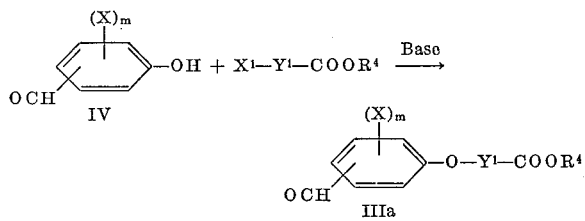

wherein $X^1$ is halogen, for example, chlorine, bromine, iodine, etc.; $Y^1$ is a methylene or trimethylene radical and $R^4$, X and $m$ are as defined above.

Those formyl substituted phenoxyalkanoic acid ester starting materials wherein the alkylene chain contains two linear carbon atoms between the carboxy and oxygen moieties are prepared from their corresponding nuclear hydroxy substituted benzaldehyde precursors (IV) by the reaction of the latter with propiolactone or with an appropriately substituted propiolactone in the presence of a base such as an aqueous solution of sodium hydroxide, preferably, while heating the solution at reflux temperatures; followed by the acidification of the carboxylate intermediate (IIIb, infra) thus formed to yield the corresponding formyl substituted phenoxyalkanoic acid (IIIc) and conversion of the said acid to the corresponding ester derivative (IIId, infra) by treatment with an alkanol in the presence of acid, for example, hydrochloric acid, p-toluenesulfonic acid, etc. The following equation illustrates the reaction:

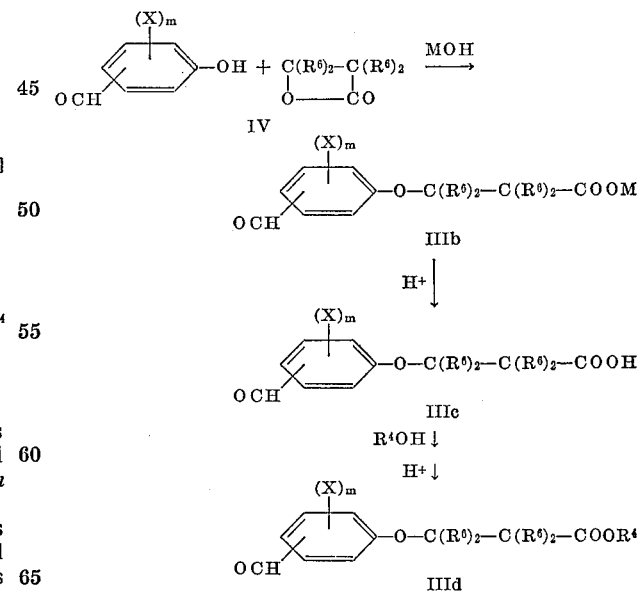

wherein $R^6$ is a member selected from the group consisting of hydrogen and lower alkyl, for example, methyl; M is the cation derived from an alkali metal hydroxide such as sodium hydroxide and $R^4$, X, $m$ and $H^+$ are as defined above.

The formylation process for preparing the formyl substituted phenoxyalkanoic acid ester reactants consists in treating an appropriate phenoxyalkanoic acid ester (V, infra) with formaldehyde and concentrated hydrochloric acid to obtain the corresponding chloromethyl substituted phenoxyalkanoic acid ester (VI, infra) and the chloromethyl derivative thus obtained is then treated with hexamethylenetetramine and concentrated hydrochloric acid under reflux to yield the desired product (III). The following equation illustrates the process:

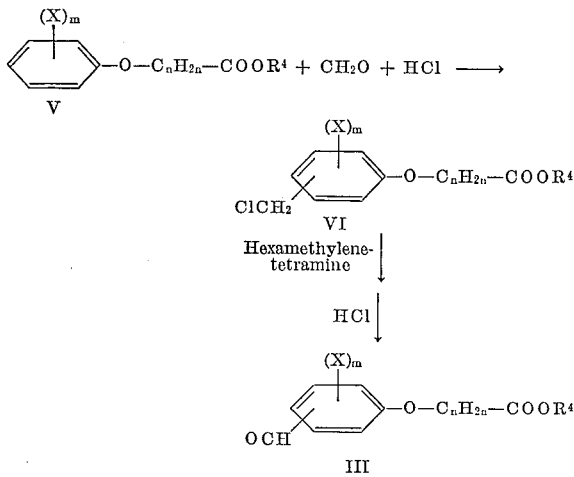

wherein $R^4$, X, m and n are as defined above.

The nuclear hydroxy substituted benzaldehyde intermediates (IV) are either known compounds or may be prepared by methods which are known to those skilled in the art. Thus, for example, by treating a phenol or appropriate nuclear substituted derivative thereof (VII, infra) with chloroform in the presence of an aqueous solution of a base and then treating the resulting mixture with an acid such as hydrochloric acid, the corresponding nuclear hydroxy substituted benzaldehyde is obtained. Alternatively, the said hydroxy substituted benzaldehyde intermediates (IV) may also be obtained by the reaction of a phenol, or appropriate nuclear substituted derivative thereof, with hydrogen cyanide or zinc cyanide and hydrogen chloride (gas) in the presence of anhydrous aluminum chloride. This reaction is preferably conducted in an inert solvent as, for example, in a benzene solution. The following equations illustrate these methods of preparation:

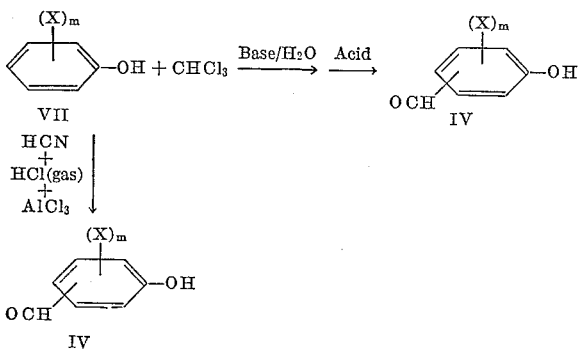

wherein X and m are as defined above.

The examples which follow illustrate the [(1-organothio-2-nitroalkyl)phenoxy]alkanoic acids (I) of the invention and the method by which they are prepared. However, the examples are illustrative only and it will be apparent to those having ordinary skill in the art that all of the products embraced by formula I, supra, may also be prepared in an analogous manner by substituting the appropriate starting materials for those set forth in the examples.

EXAMPLE 1

[2,3-dichloro-4-(1-phenylthio-2-nitropropyl)phenoxy] acetic acid

Step A: 2,3-dichloro-4-hydroxybenzaldehyde.—A mixture of 2,3-dichlorophenol (81.0 g., 0.5 mole), calcium hydroxide (280 g., 3.78 mole), sodium carbonate (320 g., 3.02 mole) and water (2 liters) is placed in a 5 liter round flask equipped with a stirrer, thermometer, reflux condenser and a dropping funnel. The mixture is warmed to 62° C. (internal temperature), the heat is removed and chloroform (129 g., 1.0 mole) is added dropwise over a period of one hour. The temperature remains at about 65° C. during the addition due to heat of reaction. The mixture is heated at 90° C. for one hour and then acidified by addition of concentrated hydrochloric acid (1300 ml.) while keeping the temperature at 70° C. by external cooling.

Upon cooling to about 20° C. a brown, gummy solid separates; then water is decanted and the residue extracted with hot toluene (500 ml.). The residual water is separated from the toluene solution which then is filtered and concentrated to 150 ml. On cooling, 17.5 g. of crude 2,3-dichloro-4-hydroxybenzaldehyde, M.P. 176–180° C., separates. The product is crystallized from toluene (150 ml.) to obtain 15.6 g. of purified 2,3-dichloro-4-hydroxybenzaldehyde, M.P. 181–183.5° C.

Analysis.—Calculated for $C_7H_4Cl_2O_2$ (percent): C, 44.01; H, 2.11; Cl, 37.12. Found (percent): C, 44.22; H, 2.30; Cl, 37.02.

Step B: Ethyl (2,3-dichloro-4-formylphenoxy)acetate. —A mixture of 2,3 - dichloro-4-hydroxybenzaldehyde (32.9 g., 0.172 mole), anhydrous potassium carbonate (38.9 g., 0.39 mole), ethyl bromoacetate (66 g., 0.39 mole) and dimethylformamide (100 ml.) is stirred and heated at 55–60° C. for one hour. Upon adding water (300 ml.) a solid separates. The solid is dried and crystallized from cyclohexane (400 ml.) to obtain 42.0 g. (84%) of ethyl (2,3-dichloro-4-formylphenoxy)acetate, M.P. 91–92° C.

Analysis.—Calculated for $C_{11}H_{10}Cl_2O_4$ (percent): C, 47.68; H, 3.64; Cl, 25.59. Found (percent): C, 47.67; H, 3.58; Cl, 25.40.

Step C: Ethyl [2,3-dichloro-4-(2-nitro-1-propenyl)phenoxy]acetate.—Ethyl (2,3-dichloro - 4 - formylphenoxy)-acetate (4.88 g., 0.0175 mole) and n-butylamine (0.985 g., 0.0135 mole) are dissolved in dry benzene (25 ml.) and the mixture is heated under a constant water separator until no more water separates. The benzene is evaporated and to the residue is added nitroethane (3.73 g.) and acetic acid (10.4 ml.). The mixture is heated to boiling, cooled and added to ice water. The solid that separates is crystallized from a mixture of 30 parts ethanol and two parts water to obtain 3.36 g. of ethyl [2,3-dichloro-4-(2-nitro-1-propenyl)phenoxy]acetate, M.P. 88–88.5° C.

Analysis.—Calcd. for $C_{13}H_{13}Cl_2NO_5$ (percent): C, 46.73; H, 3.92. Found (percent): C, 46.99; H, 3.80.

Step D: Ethyl [2,3-dichloro-4-(1-phenylthio-2-nitropropyl)phenoxy]acetate.—Ethyl [2,3-dichloro-4-(2-nitro-1-propenyl)phenoxy]acetate (2.0 g., 0.0062 mole) and benzenethiol (0.69 g., 0.0062 mole) are dissolved in absolute ethanol (75 ml.) at 50° C. Upon standing at room temperature for one hour, the solution maintains its clear yellow color. Piperidine (4 drops) is then added whereupon the yellow color disappears and a white precipitate forms. After 18 hours, the precipitate (2 g.) is collected and crystallized from absolute ethanol to yield 1.4 g. of ethyl [2,3-dichloro-4-(1-phenylthio - 2 - nitropropyl)-phenoxy]acetate, M.P. 99–100° C.

Analysis.—Calcd. for $C_{19}H_{19}Cl_2NO_5S$ (percent): C, 51.36; H, 4.31; N, 3.15. Found (percent): C, 51.36; H, 4.51; N, 3.07.

Step E: [2,3-dichloro-4-(1-phenylthio-2-nitropropyl)-phenoxy]acetic acid.—Ethyl [2,3-dichloro-4-(1-phenylthio-2-nitropropyl)phenoxy]acetate (2.3 g., 0.0052 mole) is dissolved in acetic acid (11.5 ml.) and 12 N hydrochloric acid (0.75 ml.) is added. The mixture is then heated at 80–90° C. with stirring for one hour and water is added to the hot mixture until further addition causes no more precipitation. The gummy precipitate solidifies on continued stirring and the resulting pellet-like solid is collected and triturated to a fine solid under water, collected and air dried for 16 hours. The product is crystallized from cyclohexane-benzene (3:4) to yield 1.5 g. of [2,3-dichloro-4-(1-phenylthio - 2 - nitropropyl)phenoxy]acetic acid in the form of diamond shaped prisms, M.P. 134–135° C.

Analysis.—Calcd. for $C_{17}H_{15}Cl_2NO_5S$ (percent): C, 49.05; H, 3.63; N, 3.47. Found (percent): C, 49.17; H, 3.79; N, 3.33.

EXAMPLE 2

[2,3-dichloro-4-(1-benzylthio - 2 - nitropropyl)phenoxy]acetic acid

Ethyl [2,3 - dichloro-4-(2-nitro-1-propenyl)phenoxy]acetate (2.0 g., 0.0062 mole) and benzyl mercaptan (0.87 g., 0.0062 mole) are dissolved in absolute ethanol (75 ml.) and piperidine (5 drops) is added to the yellow solution. Within three to four minutes the solution becomes colorless. The ethanol is then evaporated at 40° C. under reduced pressure and the residue is dissolved in acetic acid (10 ml.) and 12 N hydrochloric acid (0.5 ml.) is added. The mixture is heated at 80–90° C. for one hour and then poured into water whereupon [2,3-dichloro-4-(1-benzylthio-2-nitropropyl)phenoxy]acetic acid separates as a viscous oil.

EXAMPLE 3

[2,3-dichloro-4-(1-allylthio - 2 - nitropropyl)phenoxy]acetic acid

Ethyl [2,3 - dichloro-4-(2-nitro-1-propenyl)phenoxy]acetate (2.0 g., 0.0062 mole) is dissolved in absolute ethanol (75 ml.) and allyl mercaptan 0.48 g., 0.0062 mole) is added to the resulting yellow solution. Upon adding piperidine (5 drops) the yellow color disappears within five minutes. The alcohol is evaporated at 30–40° C. at reduced pressure and the residual thin oil is dissolved in acetic acid (10 ml.) and then 12 N hydrochloric acid (0.5 ml.) is added. The mixture is heated at 80–90° C. for one hour and then poured into water whereupon [2,3 - dichloro-4-(1-allylthio-2-nitropropyl)phenoxy]acetic acid separates as a thin oil.

EXAMPLE 4

[2,3-dichloro-4-(1-methylthio - 2 - nitrobutyl)phenoxy]acetic acid

Step A: Ethyl [2,3-dichloro-4-(2-nitro-1-butenyl)phenoxy]acetate.—Following the procedure of Example 1, Step C, but substituting an equimolar amount of 1-nitropropane for the nitroethane recited therein, the product ethyl [2,3-dichloro-4-(2-nitro - 1 - butenyl)phenoxy]acetate is obtained. Upon recrystallization from a mixture of eight parts acetic acid and one part water the ethyl [2,3 - dichloro-4-(2-nitro - 1 - butenyl)phenoxy]acetate melts at 113.5–114.5° C.

Analysis.—Calcd. for $C_{14}H_{15}Cl_2NO_5$ (percent): C, 48.29; H, 4.34. Found (percent): C, 48.40; H, 4.41.

Step B.—Ethyl [2,3-dichloro - 4 - methylthio-2-nitrobutyl)phenoxy]acetate.—By substituting ethyl [2,3-dichloro-4-(2-nitro-1-butenyl)phenoxy]acetate and methyl mercaptan for the ethyl [2,3-dichloro-4-(2-nitro-1-propenyl)phenoxy]acetate and benzenethiol recited in Example 1, Step D, and following the procedure described therein, the product ethyl [2,3-dichloro-4-(1-methylthio-2-nitrobutyl)phenoxy]acetate is obtained.

Step C: [2,3 - dichloro-4-(1-methylthio-2-nitrobutyl)phenoxy]acetic acid.—By substituting ethyl [2,3-dichloro-4-(1-methylthio - 2 - nitrobutyl)phenoxy]acetate for the ethyl [2,3-dichloro-4-(1-phenylthio - 2 - nitropropyl)phenoxy]acetate of Example 1, Step E, and following the procedure described therein, the product [2,3-dichloro-4-(1 - methylthio-2-nitrobutyl)phenoxy]acetic acid is obtained.

EXAMPLE 5

[4-(1-propylthio-2-nitrobutyl)-1-naphthyloxy]acetic acid

Step A: Ethyl (4-formyl-1-naphthyloxy)acetate.—A mixture of 4-formylnaphthol (13.0 g., 0.0755 mole), potassium carbonate (15.0 g., 0.151 mole), ethyl bromoacetate (25 g., 0.151 mole) and dimethylformamide (75 ml.) is heated at 55–60° C. for one hour. The mixture then is worked up as in Example 1, Step B, to obtain 13.2 g. of ethyl 4-formyl-1-naphthyloxy)acetate, M.P. 99–100° C. from alcohol. For analysis, one gram of ethyl (4-formyl-1-naphthyloxy)-acetate, crystallized two additional times from alcohol, yields a sample of product having a melting point of 100–101.5° C.

Analysis.—Calcd. for $C_{15}H_{14}O_4$ (percent): C, 69.75; H, 5.46. Found (percent): C, 69.18; H, 5.48.

Step B: Ethyl [4-(2-nitro-1-butenyl)naphthyloxy]acetate.—By substituting equimolar amounts of ethyl (4-formyl-1-naphthyloxy)acetate and 1-nitropropane for the ethyl 2,3-dichloro-4-formylphenoxy)acetate and nitroethane recited in Example 1, Step C, and following substantially the procedure described therein, the compound ethyl [4-(2-nitro-1-butenyl)-1-naphthyloxy]acetate is obtained. Upon recrystallization from ethanol the ethyl [4-(2-nitro-1-butenyl)-1-naphthyloxy]acetate melts at 117–118° C.

Analysis.—Calculated for $C_{16}H_{15}NO_5$ (percent): C, 65.65; H, 5.82. Found (percent): C, 65.85; H, 5.89.

Step C: Ethyl [4-(1-propylthio-2-nitrobutyl)-1-naphthyloxy]acetate.—By substituting propyl mercaptan for the benzenethiol recited in Example 1, Step D, and following the procedure described therein, the product ethyl [4 - (1-propylthio-2-nitrobutyl)-1-naphthyloxy]acetate is obtained.

Step D: [4-(1-propylthio-2-nitrobutyl)-1-naphthyloxy]acetic acid.—By substituting ethyl [4-(1-propylthio-2-nitrobutyl)-1-naphthyloxy]acetate for the ethyl [2,3-dichloro-4-(1-phenylthio-2-nitropropyl)phenoxy]acetate recited in Example 1, Step E, and following the procedure described therein, the product [4-(1-propylthio-2-nitrobutyl)-1-naphthyloxy]acetic acid is obtained.

EXAMPLE 6

[2,3-dimethyl-4-(1-cyclohexylthio-2-nitropropyl)phenoxy]acetic acid

Step A: Ethyl (2,3-dimethylphenoxy)acetate.—A 500 ml. round-bottom flask is charged with 2,3-dimethylphenol (78 g., 0.64 mole), dimethylformamide (450 ml.), anhydrous potassium carbonate (195 g., 1.4 mole) and ethyl bromoacetate (225 g., 1.34 mole). The stirred reaction mixture is heated at 60–65° C. in a water bath for 45 minutes and then poured into 1.5 liters of ice water. The product is extracted with ether (500 ml.), washed with three 500 ml. portions of water and dried over magnesium sulfate. The ether is distilled at reduced pressure and the product fractionated to give 86 g. (65%) of ethyl (2,3-dimethylphenoxy)acetate, B.P. 153–155° C./15 mm. The product is used in the next step without further purification.

Step B: Ethyl [2,3-dimethyl-4-(chloromethyl)phenoxy]acetate.—A 250 ml. round-bottom flask fitted with a stirrer, condenser and gas inlet tube is charged with ethyl 2,3-dimethylphenoxy)acetate (21 g., 0.1 mole), benzene (40 ml.), concentrated hydrochloric acid (25 ml.) and formaldehyde (18 ml. of a 37% aqueous solution). The vigorously stirred solution is cooled to —8° C. in an ice-salt bath and treated with hydrogen chloride for 1.5 hours. The reaction mixture is stirred at room temperature for two hours and then the benzene layer is separated, washed with water and dried over magnesium sulfate. The benzene is distilled at reduced pressure and the product is recrystallized from petroleum ether to give 23.5 g. (92%) of ethyl [2,3-dimethyl-4-(chloromethyl)phenoxy]acetate, M.P. 72–74° C.

Analysis.—Calculated for $C_{13}H_{17}ClO_3$ (percent): C, 60.82; H, 6.67; Cl, 13.81. Found (percent): C, 61.06; H, 6.61; Cl, 13.58.

Step C: Ethyl (2,3-dimethyl-4-formylphenoxy)acetate.—A mixture of ethyl [2,3-dimethyl-4-(chloromethyl)phenoxy]acetate (14.8 g., 0.057 mole), hexamethylenetetramine (14.7 g., 0.105 mole) and 60% aqueous ethanol (75 ml.) is refluxed for four hours. Concentrated hydrochloric acid (30 ml.) then is added to the reaction mixture and after five additional minutes of reflux, the mixture is poured into ice water. The product is extracted into ether and distilled to obtain 7.5 g. (56%) of ethyl (2,3-dimethyl-4-formylphenoxy)acetate, B.P. 140–145° C./0.05 mm.

*Analysis.*—Calculated for $C_{13}H_{16}O_4$ (percent): C, 66.08; H, 6.83. Found (percent): C, 66.43; H, 6.99.

Step D: Ethyl [2,3-dimethyl-4-(2-nitro-1-propenyl)-phenoxy]acetate.—Following the procedure described in Example 1, Step C, but substituting ethyl (2,3-dimethyl-4-formylphenoxy)acetate for the ethyl (2,3-dichloro-4-formylphenoxy)acetate recited therein, there is obtained ethyl [2,3 - dimethyl - 4-(2-nitro-1-propenyl)phenoxyacetate.

Step E: Ethyl [2,3-dimethyl-4-(1-cyclohexylthio-2-nitropropyl)phenoxy]acetate.—By substituting ethyl [2,3-dimethyl-4-(2-nitro-1-propenyl)phenoxy]acetate and cyclohexanethiol for the ethyl[2,3-dichloro-4(2-niro-1-propenyl)phenoxy]acetate and benzenethiol of Example 1, Step D, and following the procedure described therein, the product ethyl [2,3-dimethyl-4-(1-cyclohexylthio-2-nitropropyl)phenoxy]acetate is obtained.

Step F: [2,3-dimethyl-4-(1-cyclohexylthio-2-nitropropyl)phenoxy]acetic acid.—By substituting ethyl [2,3-dimethyl - 4 - (1-cyclohexylthio-2-nitropropyl)phenoxy]acetate for the ethyl [2,3-dichloro-4-(1-phenylthio-2-nitropropyl)phenoxy]acetate of Example 1, Step E, and following the procedure described therein, the product [2,3-dimethyl - 4 - (1-cyclohexylthio-2-nitropropyl)-phenoxy]acetic acid is obtained.

EXAMPLE 7

[2,3-dichloro-4-[1-(3-chloropropylthio)-2-nitropropyl]phenoxy]acetic acid

Step A: Ethyl 2-(2,3-dichloro-4-formylphenoxy)propionate.—A mixture of 2,3-dichloro-4-hydroxybenzaldehyde (5.0 g.), ethyl α-bromopropionate (9.2 g.) and potassium carbonate (5.2 g.) in dimethylformamide (25 ml.) is heated at 55–60° C. for 16 hours. The mixture is diluted with water and the solid that separates is crystallized from cyclohexane to obtain 4.6 g. of ethyl 2-(2,3-dichloro-4-formylphenoxy)propionate, M.P. 67.5–68.5° C.

*Analysis.*—Calculated for $C_{12}H_{12}Cl_2O_4$ (percent): C, 49.51; H, 4.15; Cl, 24.36. Found (percent): C, 49.97; H, 4.57; Cl, 23.78.

Step B: Ethyl 2-[2,3-dichloro-4-(2-nitro-1-propenyl)-phenoxy]propionate.—Ethyl 2 - (2,3 - dichloro-4-formylphenoxy)propionate (2.0 g.), n-butylamine (0.51 g.) and benzene are refluxed until no more water is distilled. The benzene is evaporated and nitroethane (1.9 g.) and acetic acid (6 ml.) are added to the residue. The mixture is refluxed for one hour and then poured onto ice. The solid that separates is crystallized from a mixture of one part benzene and one part hexane to obtain a solid identified as ethyl 2 - [2,3 - dichloro - 4 - (2 - nitro - 1 - propenyl)phenoxy]propionate.

Step C: [2,3-dichloro-4-[1-(3-chloropropylthio)-2-nitropropyl]phenoxy]acetic acid. Ethyl 2-[2,3-dichloro-4-(2-nitro-1-propenyl)phenoxy]propionate (2.0 g., 0.0062 mole) and 3-chloropropyl mercaptan (0.68 g., 0.0062 mole) are dissolved in ethanol (75 ml.) and piperidine (5 drops) is added to the solution. The ethanol then is evaporated at 40° C. under reduced pressure and the residue is dissolved in acetic acid (10 ml.) and 12 N hydrochloric acid (0.5 ml.) is added. The mixture is heated at 80–90° C. for one hour and then poured into water whereupon [2,3-dichloro-4-[1-(3-chloropropylthio)-2-nitropropyl]-phenoxy]acetic acid separates.

EXAMPLE 8

[2,4-dichloro-6-[1-(2-carboxyphenylthio)-2-nitropropyl]-phenoxy]acetic acid

Step A: Ethyl (2,4 - dichloro - 6 - formylphenoxy)acetate.—A mixture of 2,4-dichloro-6-formylphenol (25.0 g., 0.131 mole), potassium carbonate (26.4 g., 0.19 mole) and ethylbromoacetate (32.0 g., 0.19 mole) in dimethylformamide is heated at 50–55° C. for one hour and then diluted with water (300 ml.). The solid that separates is crystallized from a mixture of four parts alcohol and three parts water to obtain 31 g. of ethyl (2,4-dichloro-6-formylphenoxy)acetate, M.P. 52–53° C.

*Analysis.*—Calculated for $C_{11}H_{10}Cl_2O_4$ (percent): C, 47.69; H, 3.64; Cl, 25.60; Found (percent): C, 47.65; H, 3.97; Cl, 25.46.

Step B: Ethyl (2,4-dichloro-6-(2-nitro-1-butenyl)-phenoxy]acetate.—Ethyl (2,4-dichloro-6-formylphenoxy)acetate (4.88 g.), n-butylamine (1 g.) and benzene (50 ml.) is refluxed in a water separator until water ceases to be evolved. The benzene is evaporated and acetic acid (10 ml.) and 1-nitropropane (4.5 g.) are added. The mixture is refluxed for 10 minutes and poured into water. An oil separates and slowly solidifies. The solid is extracted with ten 50 ml. portions of hot cyclohexane and the combined extracts are concentrated to 100 ml. and allowed to cool. The solid that separates melts at 125.5–130° C. Upon further extraction with cyclohexane the melting point of the ethyl [2,4-dichloro-6-(2-nitro-1-butenyl)phenoxy]acetate is raised to 136–137° C.

*Analysis.*—Calculated for $C_{12}H_{11}Cl_2NO_5$ (percent): C, 45.02; H, 3.46; N, 4.38; Found (percent): C, 45.12; H, 3.60; N, 4.41.

Step C: [2,4-dichloro-6-[1-(2-carboxyphenylthio)-2-nitropropyl]phenoxy]acetic acid. — By substituting ethyl [2,4 - dichloro-6-(2-nitro-1-butenyl)phenoxy]acetate and thiosalicylic acid for the ethyl 2-[2,3-dichloro-4-(2-nitro-1-propenyl)phenoxy]propionate and 3-chloropropyl mercaptan of Example 7, Step C, and following the procedure described therein, the product [2,4-dichloro-6-[1-(2-carboxyphenylthio)-2-nitropropyl]phenoxy]acetic acid is obtained.

EXAMPLE 9

3-[2,3-dichloro-4-(1-acetylthio-2-nitropropyl)phenoxy] propionic acid

Step A: 3 - (2,3 - dichloro-4-formylphenoxy)propionic acid.—2,3-dichloro-4-hydroxybenzaldehyde (38.2 g., 0.2 mole) is dissolved in a 10% sodium hydroxide solution (200 ml.). The solution is heated to boiling and β-propiolactone (144 g., 2.0 moles) is added dropwise at such a rate as to keep the solution boiling. During the addition 10% sodium hydroxide solution is added in portions to maintain an alkaline mixture. Then the solution is cooled and acidified. The precipitated material is dissolved in ether and the product is extracted into a 5% sodium bicarbonate solution. Acidification of the aqueous solution precipitates 3 - (2,3 - dichloro-4-formylphenoxy)propionic acid, which is purified by recrystallization from ethyl acetate.

Step B: Ethyl 3-(2,3-dichloro-4-formylphenoxy)propionate.—3-(2,3-dichloro-4-formylphenoxy)propionic acid is dissolved in 6 N ethanolic hydrochloric acid and the mixture refluxed for one hour. The alcohol then is evaporated and the residue is dissolved in ether and the ether solution extracted with saturated sodium bicarbonate solution. The resulting solution is then dried over anhydrous sodium sulfate and evaporated to yield ethyl 3-(2,3-dichloro-4-formyl-phenoxy)propionate.

Step C: Ethyl 3-[2,3-dichloro-4-(2-nitro-1-propenyl)-phenoxy]propionate.—By following substantially the procedure described in Example 8, Step B, but substituting ethyl 3-(2,3-dichloro-4-formylphenoxy)propionate and 1-nitroethane for the ethyl (2,4-dichloro-6-formylphenoxy)-acetate and 1-nitropropane recited therein, the compound ethyl 3-[2,3-dichloro-4-(2-nitro-1-propenyl)phenoxy]propionate is obtained.

Step D: 3-[2,3-dichloro-4-(1-acetylthio-2-nitropropyl)-phenoxy]propionic acid.—By substituting ethyl 3-[2,3-dichloro - 4-(2-nitro-1-propenyl)phenoxy]propionate and thiolacetic acid for the ethyl 2-[2,3-dichloro-4-(2-nitro-1- propenyl)phenoxy]propionate and 3-chloropropyl mercaptan of Example 7, Step C, and following the procedure described therein, the product 3-[2,3-dichloro-4-(1-acetylthio-2-nitropropyl)phenoxy]propionic acid is obtained.

EXAMPLE 10

[2,3-dichloro-4-(1-phenylthio-2-nitropropyl)phenoxy]-acetamide

[2,3 - dichloro - 4 - (1 - phenylthio - 2-nitropropyl)phenoxy]acetic acid (4.16 g., 0.01 mole) is dissolved in benzene (100 ml.) and thionyl chloride (2.38 g., 0.02 mole) is added. The mixture then is refluxed for two hours and the benzene and excess thionyl chloride are evaporated at reduced pressure. Additional benzene is added and the mixture evaporated to dryness to obtain the crude acid chloride. The residue is dissolved in alcohol and excess alcoholic ammonium hydroxide is added. The alcohol then is evaporated to obtain [2,3-dichloro-4-(1-phenylthio-2-nitropropyl)phenoxy]acetamide.

EXAMPLE 11

[2,3-dichloro-4-(1-carboxymethylthio-2-nitropropyl)phenoxy]acetic acid

Ethyl 2,3 - dichloro-4-(2-nitro-1-propenyl)phenoxyacetate (2.0 g., 0.0062 mole) is dissolved in absolute ethanol (25 ml.) and to the solution is added ethyl thioglycolate (0.7 g., 0.0062 mole). Piperidine (5 drops) is then added whereupon the original yellow color of the solution disappears. The ethanol is evaporated, the oily residue is dissolved in acetic acid (10 ml.) and 12 N hydrochloric acid (½ ml.) is added. The mixture is then heated at 80–85° C. for one hour and poured into water (100 ml.). The water is decanted and the resulting gummy solid is allowed to dry in air. Upon dissolving the gum in hot benzene and then cooling solid [2,3-dichloro-4-(1-carboxymethylthio-2-nitropropyl)phenoxy]acetic acid separates.

In a manner similar to that described in Example 1 for the preparation of [2,3-dichloro-4-(1-phenylthio-2-nitropropyl)phenoxy]acetic acid all of the [4-(1-organothio-2-nitroalkyl)phenoxy]alkanoic acid products of the invention may be obtained. Thus, by substituting the appropriate nuclear hydroxy substituted benzaldehyde, alkyl haloalkanoate, nitroalkane and mercaptan, respectively, for the 2,3-dichloro-4-hydroxybenzaldehyde, ethyl bromoacetate, nitroethane and benzenethiol recited in Example 1, Steps B, C and D and following the procedure described in Steps B–E of that example all of the [4-(1-organothio-2-nitroalkyl)phenoxy]alkanoic acid products of the invention may be obtained. The following equations illustrate the reaction of Example 1, Steps B–E, and, together with Table I, depict the nuclear hydroxy substituted benzaldehyde, alkyl haloalkanoate, nitroalkane and mercaptan starting materials of the process and the corresponding products (Ib, infra) derived therefrom:

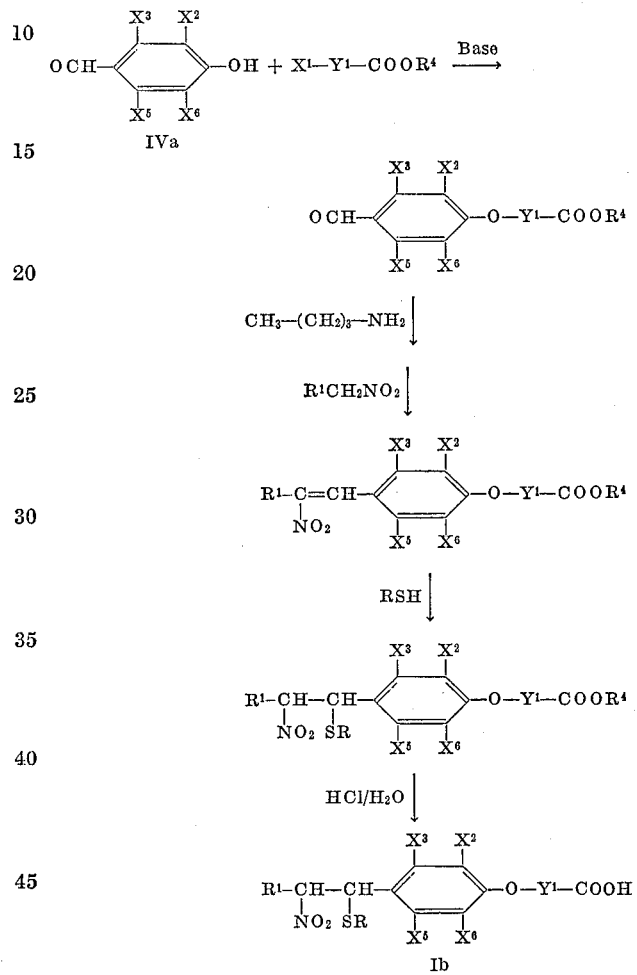

TABLE I

| Ex. | R | $R^1$ | $R^4$ | $X^2$ | $X^3$ | $X^5$ | $X^6$ | $Y^1$ |
|---|---|---|---|---|---|---|---|---|
| 12 | $-CH_2-CH=CH_2$ | H | $-C_2H_5$ | Cl | Cl | H | H | $-CH_2-$ |
| 13 | $-CH_3$ | $-C_2H_5$ | $-C_2H_5$ | $-CH_3$ | $-CH_3$ | H | H | $-CH_2-$ |
| 14 | $-(CH_2)_3CH_3$ | $-(CH_2)_3CH_3$ | $-C_2H_5$ | Cl | Cl | H | H | $-CH_2-$ |
| 15 | $-C_2H_5$ | $-(CH_2)_4CH_3$ | $-CH_3$ | H | Br | H | H | $-CH_2-$ |
| 16 | $-COCH_3$ | $-CH_3$ | $-CH_3$ | H | Cl | H | H | $-(CH_2)_3-$ |
| 17 | $-CH_3$ | $-C_2H_5$ | $-CH_3$ | H | F | H | H | $-CH_2-$ |
| 18 | $-C_2H_5$ | $-(CH_2)_2CH_3$ | $-C_2H_5$ | Cl | H | H | H | $-CH_2-$ |
| 19 | -⟨S⟩ | $-C_2H_5$ | $-CH_3$ | I | H | H | H | $-(CH_2)_3-$ |
| 20 | $-CH_2-CH_2-$⟨⟩ | $-(CH_2)_5CH_3$ | $-(CH_2)_2CH_3$ | F | H | H | H | $-CH_2-$ |
| 21 | $-CH_3$ | $-C_2H_5$ | $-C_2H_5$ | $-CH_3$ | H | $-CH_3$ | $-CH_3$ | $-CH_2-$ |
| 22 | -⟨⟩ | H | $-CH_3$ | $-CH_3$ | $-CH_3$ | $-CH_3$ | $-CH_3$ | $-CH_2-$ |
| 23 | -⟨S⟩ | $-(CH_2)_4CH_3$ | $-CH_3$ | H | $-CH_3$ | $-CH_3$ | H | $-(CH_2)_3-$ |
| 24 | $-CH_2-$⟨⟩ | $-C_2H_5$ | $-C_2H_5$ | $-(CH_2)_4-$ | | H | H | $-CH_2-$ |
| 25 | $-CH_2-CH_2-CH_2Cl$ | $-CH_3$ | $-(CH_2)_2CH_3$ | $-CH_3$ | $-CH_3$ | H | $-CH_3$ | $-(CH_2)_3-$ |
| 26 | $-CH_2-CH_2COOH$ | $-C_2H_5$ | $-CH_3$ | H | F | H | H | $-CH_2-$ |

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be administered by mixing 20 mg. of a [(1-organothio-2-nitroalkyl)phenoxy]alkanoic acid (I) or a suitable ester or amide derivative thereof, with 174 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the products of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 27

Dry-filled capsules containing 20 mg. of active ingredient per capsule

| | Per capsule, mg. |
|---|---|
| [2,3-dichloro-4-(1-phenylthio-2-nitropropyl)phenoxy] acetic acid | 20 |
| Lactose | 174 |
| Magnesium stearate | 6 |
| Capsule size No. 3 | 200 |

The [2,3 - dichloro-4 - (1 - phenylthio-2-nitropropyl) phenoxy]acetic acid is reduced to a No. 60 powder and lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of one or more of the other novel compounds of this invention and varying the amounts of the ingredients to obtain the desired dosage.

It will be apparent from the foregoing description that the [(1-organothio-2-nitroalkyl)phenoxy]alkanoic acid products (I) of this invention and the corresponding ester and amide derivatives thereof constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:
1. A compound having the formula:

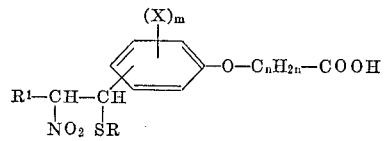

wherein R is lower alkyl, cycloalkyl containing 5–6 nuclear carbon atoms, lower alkenyl, halo lower alkyl, carboxy lower alkyl, lower alkanoyl, mononuclear aryl, carboxy substituted mononuclear aryl or mononuclear aralkyl; $R^1$ is hydrogen or lower alkyl; the X radicals are similar or dissimilar members selected from hydrogen, halogen, lower alkyl and, taken together, two X radicals on adjacent carbon atoms of the benzene ring may be joined to form an hydrocarbylene chain containing from 3–4 carbon atoms between their points of attachment; $m$ is an integer having a value of 1–4 and $n$ is an integer having a value of 1–3; and the nontoxic, pharmacologically acceptable alkyl esters, amides, lower alkylamides and di-lower alkylamides thereof.

2. The product of claim 1 wherein $R^1$ is lower alkyl.
3. The product of claim 1 wherein X is halogen.
4. The product of claim 3 wherein $n$ is an integer having a value of 1.
5. A product according to claim having the formula:

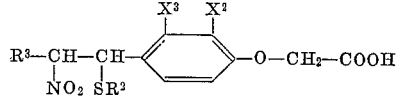

wherein $R^2$ is lower alkyl, lower alkenyl, lower alkanoyl, phenyl or 2-carboxyphenyl; $R^3$ is lower alkyl and $X^2$ and $X^3$ are similar or dissimilar members selected from hydrogen, halogen and lower alkyl; and the nontoxic, pharmacologically acceptable lower alkyl esters and amides thereof.

6. The product of claim 5 wherein $X^2$ and $X^3$ are halogen.
7. The product of claim 5 wherein $R^2$ is lower alkyl and $X^2$ and $X^3$ are halogen.
8. The product of claim 5 wherein $R^2$ is phenyl and $X^2$ and $X^3$ are halogen.
9. The product of claim 5 wherein $R^2$ is 2-carboxyphenyl and $X^2$ and $X^3$ are halogen.
10. The product of claim 5 wherein $R^2$ is lower alkenyl and $X^2$ and $X^3$ are halogen.
11. The product of claim 5 wherein $R^2$ is phenyl, $R^3$ is methyl and $X^2$ and $X^3$ are chloro.

References Cited

UNITED STATES PATENTS 3,409,661   11/1968   Schultz _____ 260—471

OTHER REFERENCES

Migrdichian, Organic Synthesis, vol. II, p. 876.

LORRAINE A. WEINBERGER, Primary Examiner

E. J. GLEIMAN, Assistant Examiner

U.S. Cl. X.R.

260—470, 559; 424—309, 317, 324